A. R. T. MILLER.
TRUCK.
APPLICATION FILED MAR. 2, 1914.
1,117,586.
Patented Nov. 17, 1914.
2 SHEETS—SHEET 1.
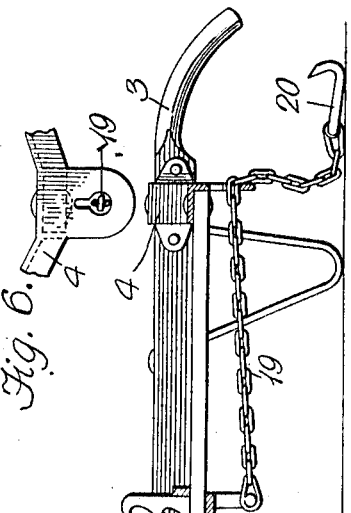
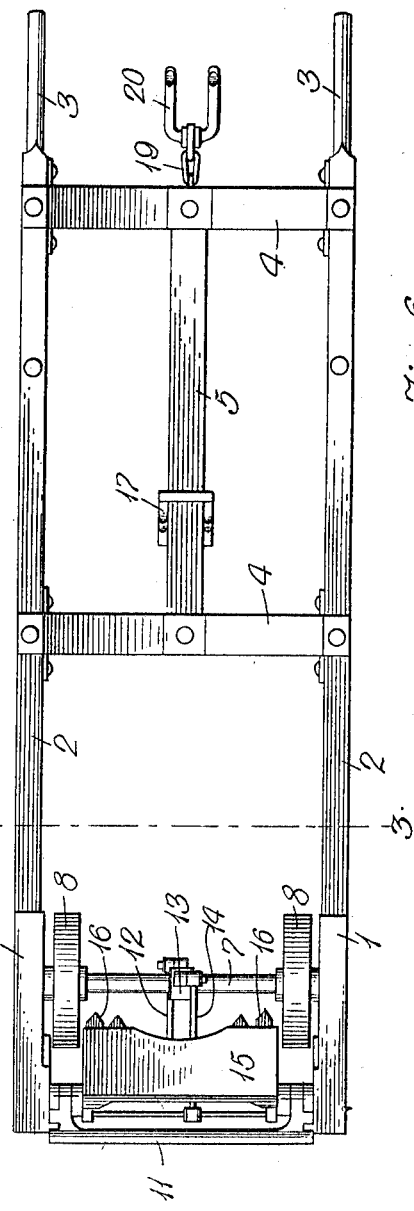
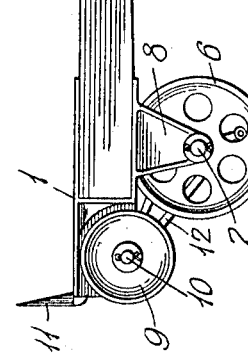
Inventor
A. R. T. Miller,
Witnesses
Chas. W. Stauffiger
Anna M. Dorr
By
Attorneys A. R. T. MILLER.
TRUCK.
APPLICATION FILED MAR. 2, 1914.
1,117,586.
Patented Nov. 17, 1914.
2 SHEETS—SHEET 2.
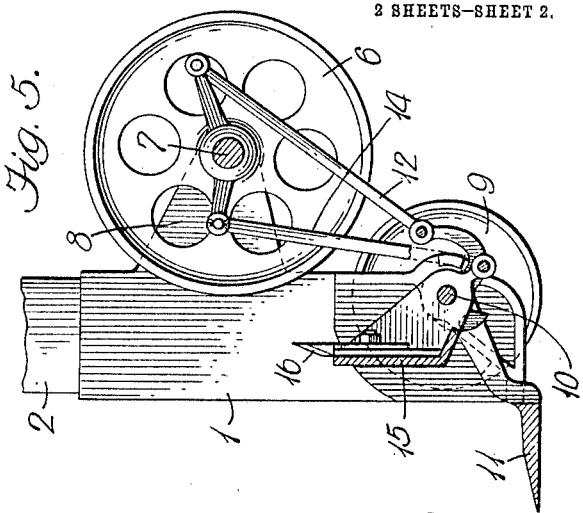
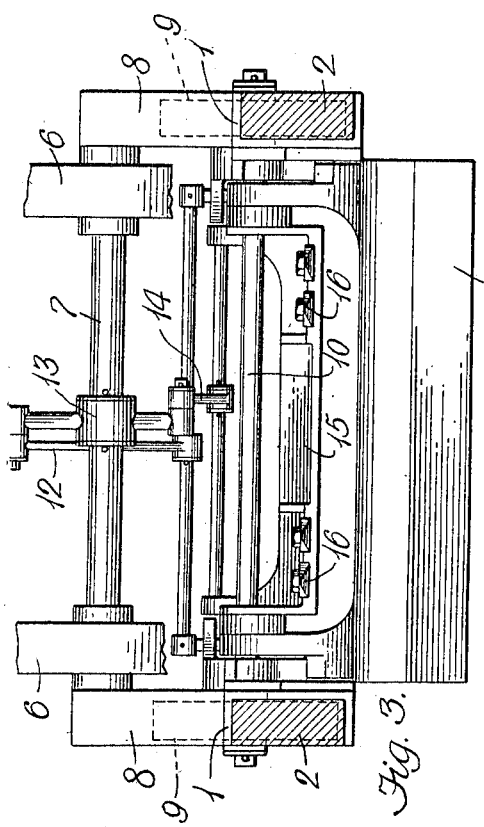
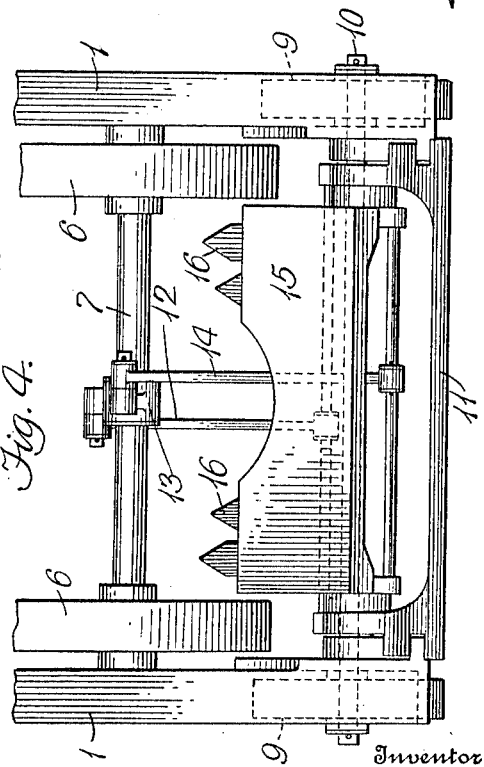
Witnesses
Chas. W. Stauffiger
Anna M. Dorr
Inventor
A. R. T. Miller,
By
Attorneys

UNITED STATES PATENT OFFICE.

A. R. T. MILLER, OF DETROIT, MICHIGAN.

TRUCK.

1,117,586.   Specification of Letters Patent.   Patented Nov. 17, 1914.

Application filed March 2, 1914. Serial No. 821,864.

*To all whom it may concern:*

Be it known that I, A. R. T. MILLER, a citizen of the United States of America, residing at Detroit, in the county of Wayne and State of Michigan, have invented certain new and useful Improvements in Trucks, of which the following is a specification, reference being had therein to the accompanying drawings.

This invention relates to loading trucks and to an arrangement thereof whereby a bag, box or barrel may be raised on to the truck without the necessity of running the truck under the object in the ordinary manner.

The invention consists in the matters hereinafter set forth and more particularly pointed out in the appended claims.

In the drawings, Figure 1 is a plan view of a truck that embodies features of the invention; Fig. 2 is a view in side elevation of the truck; Fig. 3 is a view in section on line III—III of Fig. 1; Fig. 4 is a plan view, in detail, of the lower portion of the truck; and Fig. 5 is an enlarged view in section of the lower portion of the truck. Fig. 6 is a detail view showing chain lock.

Referring to the drawings, a pair of oppositely disposed bearing plates 1 together with side bars 2 which terminate in handles 3 are secured in spaced relation by cross members 4, the latter being united by a central longitudinal guide member 5. The truck is normally carried by a pair of bearing wheels 6 journaled on an axle 7 and engaging brackets 8 of the members 1, the latter being suitably ribbed and flanged to combine strength with lightness. A pair of loading wheels 9 are pivoted each on a shaft 10 or the like on the web member of the part 1 so that when the truck is uptilted the nose thereof may be brought closely to the floor while still riding on the wheels 9. A foot member 11 spans the truck between the members 1 in which it is pivoted to be uptilted into operative position by link connections 12 of suitable design and a rock arm 13 that is preferably mounted on the shaft 7 or in such a position at least that it may be operated by the foot of a person holding the truck. An auxiliary shoe 15 is likewise mounted between the members 1 in such connection and relation to the member 11 and the pedal 13, to which it is operatively secured by links 14, that when the foot member 11 is in position for loading, the other member or shoe 15 is swung out of the way between the side bars 2 of the frame, and when the shoe is in loading position, the member 11 hangs below the level of the loading face of the frame. The shoe 15 may have adjustable spurs 16 by which it may be thrust into the side of a box or barrel, or at least engage it sufficiently to prevent slipping. A clamping member or head 17 in sliding engagement on the guide 5 carries a pair of spurs or suitable hooks 18 that may be dropped over the chine of a barrel or the edge of a box when the truck is run up against the latter in up-tilted position on the loading wheels 9. If desired a flexible chain 19 or like means that is adjustable through a properly shaped slot in the frame of the truck together with a suitable hook 20 may also be provided to hold objects that cannot be engaged readily by the clamping head 17, the chain also serving as means for manipulating the head 17. As a result of this construction, a truck is obtained which may be readily run up against the side of an upright barrel or a standing box or sack, and by manipulation of the head or chain so secured to the object that it tilts the latter back on to the truck in substantially balanced position on the bearing wheels without the necessity of the operator moving the object to allow the nose of the truck to under-run it as is the case with an ordinary loading truck. The truck is easily manipulated, is simple and strong in construction and may be operated so rapidly as to save a great deal of time in handling package freight in quantities.

Obviously, changes in details of construction may be made without departing from the spirit of my invention and I do not care to limit myself to any particular form or arrangement of parts.

What I claim is:—

1. A loading truck comprising a main frame, bearing wheels normally supporting one end thereof, loading wheels adjacent the bearing wheels adapted to carry the truck when the frame is up-tilted, a foot member spanning the wheel end portion of the frame, a foot pedal operatively connected to the foot member to swing the latter in and out of loading position, an auxiliary shoe adapted to move into loading position when the foot member is in inoperative position, and means connecting the foot pedal to the shoe for moving the latter.

2. A loading truck comprising a main frame, bearing wheels normally supporting one end thereof, loading wheels adjacent the bearing wheels for carrying the truck when it is up-tilted, a foot member movably secured on the wheel end portion of the frame, an auxiliary shoe movably secured on the wheel end portion of the frame, a foot pedal beneath the frame and connections between the pedal, the foot member and the shoe adapted to swing the foot member into loading position when the pedal is moved in one direction and the shoe into loading position when the pedal is moved in the opposite direction.

3. A loading truck comprising a main frame, bearing wheels normally supporting one end thereof, loading wheels adjacent the bearing wheels for carrying the truck when it is up-tilted, a foot member pivotally secured on the wheel end portion of the frame, an auxiliary shoe pivotally secured on the wheel end portion of the frame, means on the frame operatively connected to the foot member and shoe to swing one or the other into operative position, a guide member on the frame and a clamping member in sliding engagement with the guide member adapted to coöperate with the foot member or the shoe for retaining an object on the truck.

4. A loading truck comprising oppositely disposed bearing plates, a pair of bearing wheels on which the plates are journaled between the ends thereof, a main frame whose side members are secured to and form an extension of the plates, loading wheels each pivotally secured to the other end portion of the bearing plates, a foot member swinging on the bearing plates, an auxiliary shoe swinging on the bearing plates, means on the frame operatively connected to the foot member and shoe to move either one into loading position, a guide member on the frame, and means adjustably secured on the guide member and adapted to coöperate with the foot member or shoe to retain an object on the truck when the latter is tilted from the loading wheels onto the bearing wheels.

5. A loading truck comprising a frame normally supported near one end on bearing wheels and provided with loading wheels at said end on which it is adapted to rest when in upright position, a foot member and an auxiliary shoe swinging on the wheel end portion of the frame, a pedal operatively connected to the member and shoe and adapted to move either one or the other into position to engage an object when the truck is up-ended on the loading wheels and moved against the side of the object, and holding means adjustably secured on the upper portion of the frame for engaging the body of an object in contact with the foot member or shoe and adapted to coöperate with the latter for retaining the object on the truck when the latter is tilted back onto the bearing wheels.

In testimony whereof I affix my signature in presence of two witnesses.

A. R. T. MILLER.

Witnesses:
C. R. STICKNEY,
ANNA M. DORR.

Copies of this patent may be obtained for five cents each, by addressing the "Commissioner of Patents, Washington, D. C."